United States Patent [19]

Schnell

[11] 4,192,193
[45] Mar. 11, 1980

[54] LIQUID FILLED PRESSURE GAUGE

[75] Inventor: Werner J. Schnell, Niles, Ill.

[73] Assignee: General Signal Corporation, Stamford, Conn.

[21] Appl. No.: 12,681

[22] Filed: Feb. 16, 1979

[51] Int. Cl.² .................................................. G01L 7/04
[52] U.S. Cl. ........................................ 73/739; 73/741
[58] Field of Search .......... 73/739, 738, 741, 732–740, 73/742, 743, 431

[56] References Cited

U.S. PATENT DOCUMENTS

| | | | |
|---|---|---|---|
| 1,494,496 | 5/1924 | Manning | 73/739 |
| 2,384,928 | 9/1945 | Kahn | 73/431 |
| 3,293,917 | 12/1966 | van der Heyden | 73/431 |
| 3,701,284 | 10/1972 | DeMeyer | 73/738 |
| 3,776,041 | 12/1973 | Wetterhorn | 73/739 |
| 3,874,241 | 4/1975 | Harland et al. | 73/738 |
| 3,888,127 | 6/1975 | Shamlian et al. | 73/431 |
| 3,921,455 | 11/1975 | Staubli et al. | 73/741 |
| 3,929,020 | 12/1975 | Honkanen | 73/738 |
| 4,154,116 | 5/1979 | Stahn et al. | 73/738 |

*Primary Examiner*—Donald O. Woodiel
*Attorney, Agent, or Firm*—Thomas R. FitzGerald

[57] ABSTRACT

A pressure gauge has a Bourdon tube element and a pointer mechanism supported on an inner support member which is substantially contained inside the case body of the gauge. The inner support member has a bore in communication with the inner space of the Bourdon tube. The case body has a flattened, outwardly projecting wall zone surrounding a first aperture. An end surface of the inner support member has a contour adapted to the contour of the case wall zone. The matching contours serve to position the inner support member and an outer connection member threads into the inner support member to hold it tightly in place. Seals are provided between the inner support and outer connection members and between the outer connection members and the case body. An air cushion sits on top of the dampening fluid. The air cushion is vented through a vent plug having a longitudinal bore that is terminated by a cross hole transverse to the bore. The vent plug is slidably supported by a grommet that seals a second aperture above the air cushion. When the vent plug is raised, the cross hole is closed off.

12 Claims, 5 Drawing Figures

LIQUID FILLED PRESSURE GAUGE

LIQUID FILLED PRESSURE GAUGE

1. Background of the Invention

This invention relates to liquid filled pressure gauges, and, in particular, to gauges having Bourdon tube measuring elements. Bourdon tube pressure gauges are widely used to measure the pressure of fluids. Such gauges work on the principle that pressure in a curved tube will tend to straighen it. When pressure is applied to the inner space of the tube, the tube will straighten out until the difference in force exerted by the fluid inside the tube is balanced by the elastic resistance of the material composing the tube. It is well known in the art to couple a rotatable pointer to the free end of the tube through a suitable transmission mechanism. Hence, as the Bourdon tube straightens out under increasing pressure, the pointer is proportionally turned. Pressure may be read off of a scale that is suitably aligned with the pointer.

Bourdon gauges are often used in highly corrosive atmospheres and in locations where severe vibrations or pressure pulsations or both are present. Under such circumstances, it is well known to fill these gauges with a viscous liquid such as mineral oil or glycerine. The liquid will act as a damper to counteract the vibrations and pressure pulsations and as a lubricant for the moving parts of the pointer mechanism and will isolate the interior of the guage from corrosive atmospheres.

Due to the presence of the liquid inside the gauge as well as fluid which pressurizes the inner space of the Bourdon tube, it is desirable to have a well sealed gauge in order to prevent the leakage of any dampening liquid or pressurized measured fluid.

Of course, such gauges still must be reliably sealed. One example of an attempt to achieve such a reliable seal may be found in U.S. Pat. No. 3,921,455. The device described in that patent includes an inner support piece which carries the pointer mechanism and Bourdon tube. A nipple-like portion of that support piece passes through an aperture in the case body and an internally threaded connecting piece screws onto the projecting nipple. The accuracy of liquid filled gauges is affected by changes in the ambient temperature and pressure of the liquid. Accordingly, it is known to provide liquid filled gauges with an internal air cushion above the oil. Such a cushion allows the liquid to expand or contract as the ambient temperature or pressure of the liquid changes. However, the air cushion is itself subject to ambient temperature and pressure changes so it is desirable to vent the air cushion. Venting the air cushion also relieves the pressure on the liquid seals of the gauge and thereby lengthens their useful lives. Examples of venting devices may be found in U.S. Pat. Nos. 3,874,241; 3,776,041 and 3,701,284. Such devices respectively include a solid, flanged plug, movable between a sealed position and a venting position, a spring biased relief valve and resilient plug. The solid flanged plug device requires a special casing with two closely spaced openings therein, and is thus costly to manufacture. The other devices rely on a resilient element which could break, stick, or otherwise fail to adjust to ambient pressure and temperature changes. Accordingly, there is a need for a reliable, inexpensive venting device.

OBJECTS OF THE INVENTION

It is an object of this invention to provide a new and improved liquid filled pressure gauge.

It is a further object of this invention to provide a liquid filled pressure gauge having an inner support member contained within the case of the pressure gauge.

It is a further object of this invention to provide a pressure gauge having an inner support member with a first bore therein for sealingly receiving an outer connection member.

It is still another object of this invention to provide an outer connecting member having a threaded nipple portion which sealingly engages the bore of an inner supporting member.

It is an object of this invention to provide a reliable, easily manufactured venting device.

It is a further object of this invention to provide a venting device which relieves the liquid pressures in the gauges and thereby lengthens the life of the liquid seals.

Another object of this invention is to provide a vent plug that is movable between sealing and venting positions.

SUMMARY OF THE INVENTION

In order to achieve the foregoing objects, the invention provides for a pressure gauge that has a case body with a cup-shaped housing having an aperture therein. The housing includes an outward protrusion with a flat wall zone surrounding the aperture. A support member has a first bore therein and is arranged within the case body. The support member carries the Bourdon tube as well as a pressure indicating means. The support member includes an end surface adapted to rest on the flat wall zone of the cup case body. The end surface of the inner support member has an outer contour that is adapted to the contour of the flat wall zone. The inner support member has a bore which is in communication at one end with the inner space of the Bourdon tube and at the other end with the aperture in the case.

An outer connection member couples the inner supporting member to the measured fluid. The outer connection member has a bore and includes a first section which extends through the aperture and is sealingly received within the first bore of the inner support member. The outer connection member also sealingly engages the flat wall zone on the outside of the case body in order to provide a fluid tight seal against the measured, pressurized fluid.

More particularly, the outer connecting member has three sections. The first section extends through the aperture as stated above. That first section terminates in a tip portion which is encircled by an "O" ring type seal. Adjacent the tip portion and extending along a length of the outer connecting member is an external thread which mates with an internal thread formed in the end of the inner supporting member. The second portion of the outer connecting member includes a nut-shaped outer surface having a shoulder adapted to abut against the case. The shoulder has an annular groove cut in it for receiving a second "O" ring in order to form a tight seal which prevents the leakage of dampening fluid. The third portion of the outer connecting member is adjacent the second portion and is adapted to have suitable means, such as an external or internal thread for connection to a fitting in communication with the measured fluid.

In addition, a venting device is provided for venting an air cushion on top of the dampening liquid to the atmosphere. The venting device includes a vent plug that is held in place by a grommet in the case body of the gauge. The vent plug is cylindrical in shape and has an outer flange and an inner flange at its opposite ends. A longitudinal bore extends from the outer flange to a cross hole adjacent the inner flange. In its sealed position, the inner flange sealingly engages the grommet which closes off the cross hole. The vent plug is held in its sealed position by a retaining ring that is removably positioned between the outer flange and the grommet. To vent the air cushion, an operator removes the retaining ring and depresses the vent plug, thereby moving the cross hole into the air cushion which is then in communication with the atmosphere.

Other objects, advantages and novel features of the present invention will become apparent from the following detailed description of the invention when considered in conjunction with the accompanying drawings.

BRIEF DESCRIPTION OF THE DRAWINGS

FIG. 3 is a portion of the section of FIG. 1 but in enlarged scale showing the connection between the inner supporting member and the outer connecting member;

FIG. 5 is a portion of FIG. 1 showing the venting device in its venting position.

DESCRIPTION OF THE PREFERRED EMBODIMENT

Figure 1:
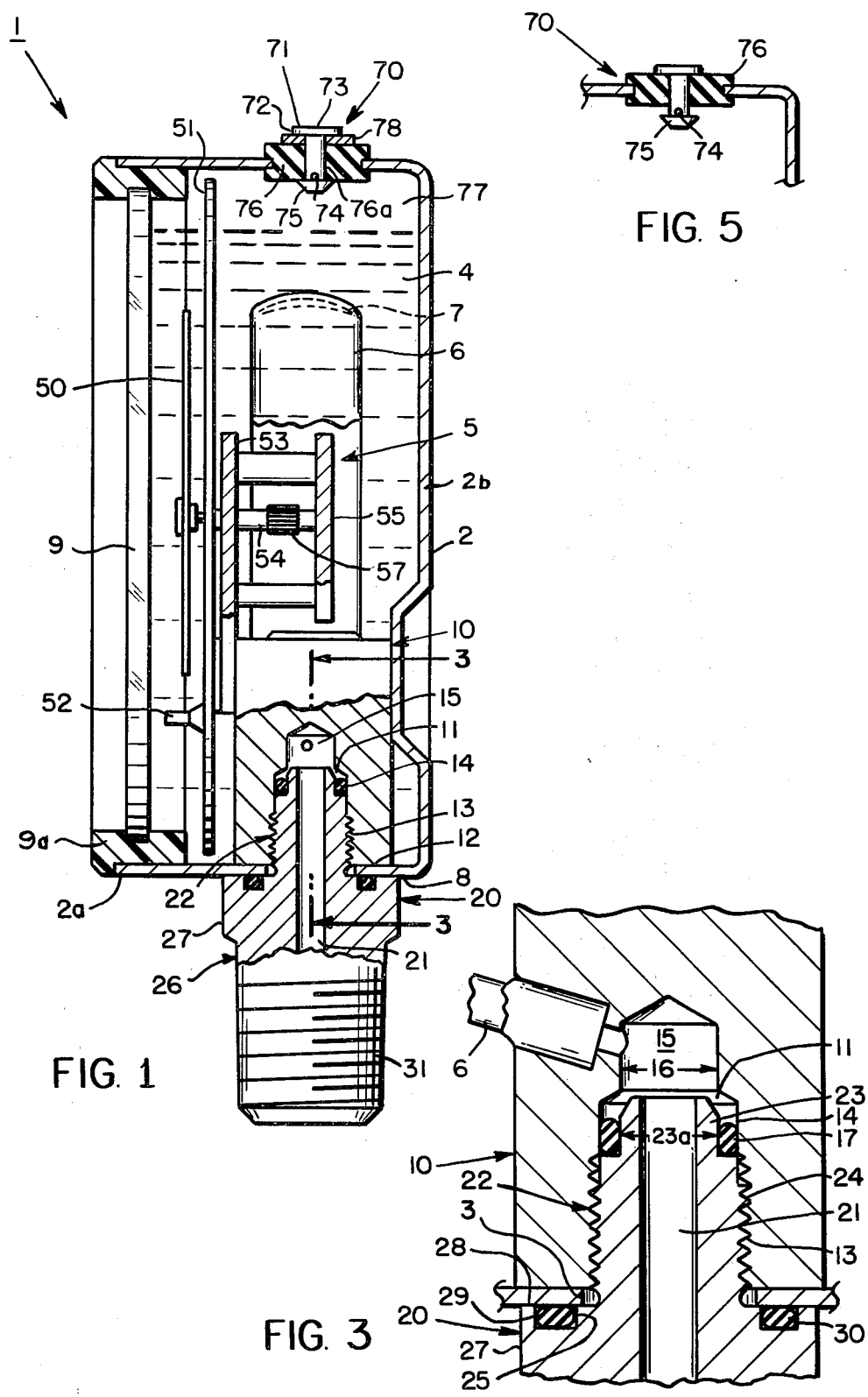
FIG. 1 is a section through the gauge.
Figure 2:
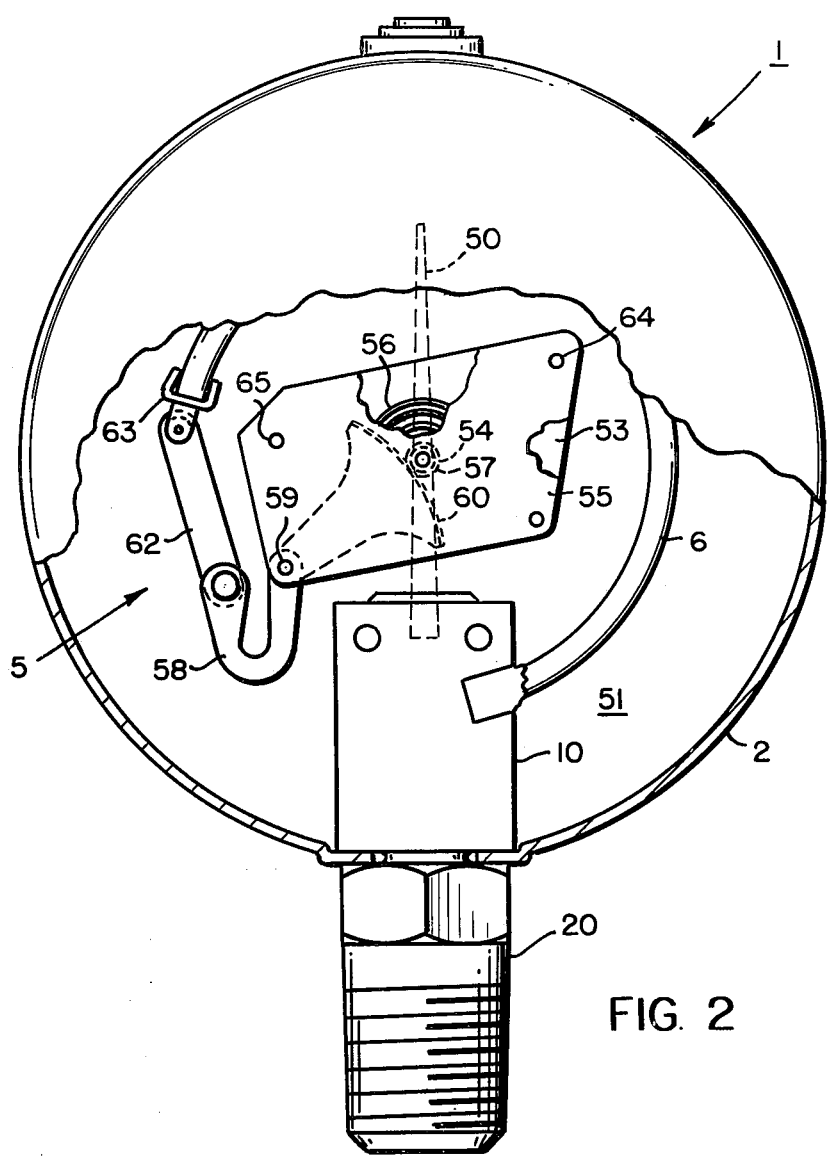
FIG. 2 is a top plan view.
Figure 4:
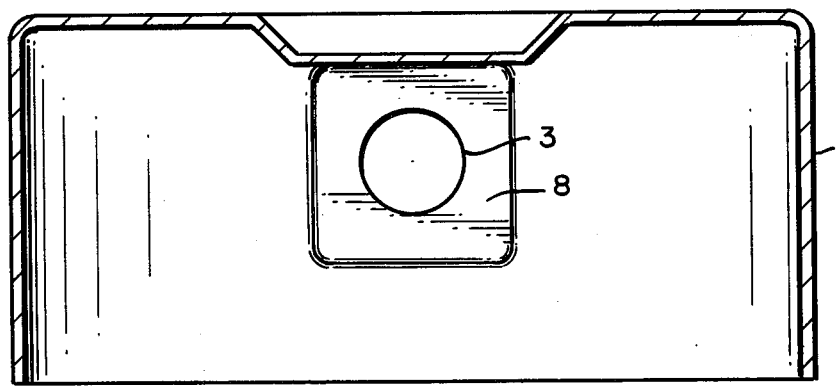
FIG. 4 is a horizontal sectional view of the case body showing the aperture and the protruding wall zone.

Turning now to the drawings, in particular, FIG. 1, there is generally shown at reference number 1 a liquid filled Bourdon tube type pressure gauge. The case body 2 includes a cylindrical wall 2a having an aperture 3 and a flat, back wall 2b. Formed into the wall 2a at aperture 3 is an outwardly protruding flat wall zone 8 (see FIG. 4) which blocks an inner support piece 10 against twisting and thereby fixes the desired position of the complete unit as shown in FIG. 1.

Inner support member 10 carries a Bourdon tube 6 and a pointer mechanism 5. The support member 10 includes an end surface 12 that is shaped to conform to the contour of flattened wall zone 8 of case body 2. A bore 11 extends from the end surface 12 along a substantial portion of the length of inner support member 10. The bore 11 includes a first internal threaded portion 13, a second sealed portion 14 adjacent the first threaded portion 13 and a third portion 15 adjacent the second portion 14 and having a diameter 16 that is smaller than the diameter of the second portion 14 and is in communication with inner space 7 of Bourdon tube 6.

Outer connection member 20 has a bore 21 along its entire length for putting the inner support member bore 11 into communication with the fluid to be measured. Outer connection member 20 positions inner support member 10 in its proper position as determined by flat wall zone 8. Bore 21 extends through first section 22 and second section 26 of outer connecting member 20. First section 22 includes a tip portion 23 that has a first diameter 23a for sealingly coacting with the second sealed portion 14 of inner support member 10. Adjacent tip portion 23 is a second externally threaded portion 24 which is adapted to be received in said first internally threaded portion 13 of inner support member 10. A third sealed portion 25 is adjacent the second threaded portion 24 for sealingly coacting with the flattened wall zone 8 of case body 2. An "O" ring 17 is disposed between the opposing surfaces of second sealed portion 14 of inner support member 10 and third sealed portion 25 of outer connecting member 20 in order to prevent the measured pressurized fluid from leaking out of bores 11 and 21. Hence, it is readily apparent that first section 22 of outer connecting member 20 is substantially enclosed within inner support member 10 when outer connecting member is installed.

The second section 26 of outer connecting member 20 is substantially disposed outside of inner support member 10 and case body 2. Second section 26 is adjacent first section 21 and includes a nut-shaped external fourth portion 27. The nut-shaped portion 27 has a shoulder 28 adjacent the third sealed portion 25 of first section 22. The shoulder 28 has an annular groove 29 cut therein for receiving a second sealing "O" ring 30. Adjacent the fourth nut-shaped portion 27 a fifth threaded portion 31 which is connectable to a fitting that is in fluid communication with the fluid to be measured. Threaded portion 31 is shown to have an internal thread, however, those skilled in the art will know that it may also carry an external thread, depending upon the fitting that is connected to the measured pressurized fluid. The "O" ring 30 seals the dampening fluid 4 inside the case body 2.

The operation of Bourdon tube 6 and pointer mechanism 5 are well known to those skilled in the art. Accordingly, the following description of their structure and operation is only presented in the detail necessary in order to clarify the invention.

A base plate 53 is suitably secured to inner support member 10 by means of two solid studs 40 that are each anchored at one end in member 10. Those studs 40 are extended at their respective other ends in order to secure a dial 51 in position. An auxiliary base plate 55 is ridgedly connected to base plate 53 by means of pins 64, 65. The pointer 50 is fixed to a spindle 54 mounted between the plates 53, 55. The spindle 54 is biased as usual by a weak, spirally wound return spring 56. A pinion gear 57 is coaxially mounted on the spindle 54. A transmission lever 61 has an axle 59 mounted between the plates 53, 55. Mounted on axle 59 is a segment gear 60 that meshes with the spindle pinion gear 57. Transmission lever 58 is coupled by a link 62 to a bracket 63. Bracket 63 is secured to and depends from the free end of the Bourdon tube 6.

In operation, pressurized fluid enters the Bourdon tube inner space 7 through the passage provided by support member bores 11, 21. As pressure increases, the Bourdon tube 6 tends to straighten out thereby causing segment gear 60 to turn through the connection provided by transmission lever 58. As gear 60 turns, the spindle pinion 57 turns with it thereby rotating the pointer 15 in a clock-wise manner.

The entire gauge 1 may be assembled by inserting support piece 2 together with the parts carried by that piece, including Bourdon tube 6 and pointer mechanism 5, into case body 2. After inner support member pieces inserted therein, outer connecting member 20 is threaded tightly into the first threaded portion 13 of inner support member 10. Case body 2 is provided on the dial side with a window shield 9. A rubber grommet 9a holds the window shield 9 in place and seals against leakage of the dsmpening fluid 4.

Turning once again to FIG. 1, there also is shown a venting device 70 disposed in an aperture 80 of the cylindrical wall 2a of case body 2. The aperture 80 is disposed above an air cushion 77 which is on top of the dampening liquid 4. The venting device 70 includes a vent plug 71 which is held in position by a resilient grommet 76. Vent plug 71 is cylindrically shaped and has a longitudinal bore 73 that extends from an outer flange 72 to a cross hole 74. Adjacent cross hole 74 is inner flange 75.

A retaining ring 78 keeps the vent plug in a sealed position. In that position, the cross hole 74 is sealed against inner wall 76a of grommet 76. Retaining ring 78 holds the inner flange 75 against the grommet 76 and thereby prevents liquid 4 in the gauge 1 from leaking during shipping. After gauge 1 is installed, the retaining ring 78 is removed and the vent plug 71 is depressed until the outer flange 72 contacts the grommet 76. As shown in FIG. 5, the cross hole 74 is in communication with air cushion 77, thereby venting the air cushion 77 to the atmosphere through longitudinal bore 73.

In addition to the preferred embodiment described above, it is also within the spirit and scope of the invention to modify the gauge 1 to have the inner and outer support members 10,20 disposed in the back wall of case body 2. Back supported gauges are well known in the art and the foregoing description of bottom mounted gauge 1 is sufficient for one skilled in the art to modify a back supported gauge to include the invention. Such a modification as well as other modifications will be apparent to one skilled in the art and all are deemed within the spirit and scope of the appended claims.

What is claimed is:

1. A pressure gauge comprising:
a case body having a cup-shaped housing with a first aperture therein, said housing including an outward protrusion with a flat wall zone surrounding the aperture, a support member having a first bore therein arranged within the case body, said support member including an end surface adapted to rest on said flat wall zone wherein said end surface has an outer contour adapted to the contour of said wall zone, an outer connection member having a second bore there through includes a first section extending through said aperture and sealingly received within the first bore, said outer connection member sealingly engages said flat wall zone of said case body, a fluid pressure measuring spring tube having a free end and an end secured to said support member, said tube includes an inner space connected to the bore of the outer connection member through the bore in the support member, and means arranged within said case supported by the support member and operatively connected to the free end of said spring tube for indicating the measured fluid pressure acting in the tube.

2. The pressure gauge as defined in claim 1, further characterized in that said first bore includes a first internally threaded portion extending from said end surface of the support member, a second sealed portion adjacent said threaded portion, and a third portion adjacent said second portion and having a smaller diameter than said second portion for communicating with said inner space.

3. The pressure gauge as defined in claim 2, further characterized in that said first section of said outer connection member includes a tip portion having a first diameter for sealingly coacting with said second seal portion of said first bore, a second threaded portion adjacent said tip portion adapted to be received in said first threaded portion of said first bore, a third seal portion adjacent said second threaded portion for sealingly coacting with said flat wall zone, and a second section adjacent said first section having a wider cross section than said first section and including a nut-shaped fourth portion and a threaded fifth portion.

4. The pressure gauge as defined in claim 3, further including a first sealing ring adapted to be received between said tip portion and said second seal portion whereby said outer connection member is sealingly received between said third seal portion and said flat wall zone whereby said outer connection member sealingly engages said flat wall zone.

5. The pressure gauge as defined in claim 4, further characterized in that said nut-shaped fourth portion has a shoulder adjacent said third seal portion, said shoulder having an annular groove cut therein for receiving said second sealing ring.

6. The pressure gauge as defined in claim 1, further characterized in that said flat wall zone is formed in the peripheral wall of said cup-shaped housing.

7. The pressure gauge as defined in claim 1, further characterized in that said end surface of said support member has a substantially square contour and said flat wall zone has a substantially square contour adapted to receive said end surface of said support member.

8. The pressure gauge as defined in claim 1, wherein said first aperture is disposed in the cylindrical wall of said cup-shaped housing.

9. The pressure gauge as defined in claim 1, wherein said first aperture is disposed in the back wall of said cup-shaped housing.

10. The pressure gauge as defined in claim 1, further comprising a second aperture in said cup-shaped housing, a movable elongated vent plug, and axially movable between a sealing position and a venting position and having a bore terminated by a cross hole transverse to said bore and a grommet for sealing said aperture, slidably supporting said vent plug and sealing said cross hole when said vent plug is moved to its sealing position.

11. The pressure gauge as defined in claim 10, wherein said vent plug further comprises an outer flange at one end thereof for abutting against said grommet when the vent plug is in its venting position and an inner flange at the other end for abutting against the said grommet when said vent plug is in its sealing position.

12. The pressure gauge as defined in claim 11, further comprising a removable retaining means disposed between said outer flange and said grommet for retaining said vent plug in said sealing position.

* * * * *